United States Patent [19]
DiCroce et al.

[11] Patent Number: 5,850,174
[45] Date of Patent: *Dec. 15, 1998

[54] VEHICLE SECURITY SYSTEM UPGRADE

[75] Inventors: John DiCroce, Oceanside, N.Y.; Scott Christie, Weymough, Mass.

[73] Assignee: Audiovox Corp., Hauppauge, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 739,923

[22] Filed: Oct. 30, 1996

Related U.S. Application Data

[63] Continuation of Ser. No. 282,628, Jul. 29, 1994, abandoned, which is a continuation-in-part of Ser. No. 141,195, Oct. 21, 1993, abandoned.

[51] Int. Cl.⁶ .................................................. B60R 25/10
[52] U.S. Cl. .......................... 340/426; 180/287; 307/10.2
[58] Field of Search ..................................... 340/426, 428, 340/430, 825.31, 825.69, 825.72; 307/10.2; 180/287; 70/256, 237

[56] References Cited

U.S. PATENT DOCUMENTS

| | | | |
|---|---|---|---|
| 3,936,673 | 2/1976 | Kelly et al. ............................. | 340/426 |
| 4,383,242 | 5/1983 | Sassover et al. . | |
| 4,672,224 | 6/1987 | Low ........................................ | 340/426 |
| 4,737,770 | 4/1988 | Brunius et al. . | |
| 4,794,368 | 12/1988 | Grossheim et al. .................... | 340/426 |
| 4,866,417 | 9/1989 | Defino et al. . | |
| 4,881,148 | 11/1989 | Lambroopoulos et al. . | |
| 4,887,064 | 12/1989 | Drori et al. . | |
| 4,887,065 | 12/1989 | Rabitschko et al. ................... | 340/430 |
| 4,890,108 | 12/1989 | Drori et al. . | |
| 4,958,084 | 9/1990 | Carlo et al. ............................. | 340/426 |
| 4,983,947 | 1/1991 | Mullen et al. .......................... | 340/426 |
| 5,018,667 | 5/1991 | Drori et al. . | |
| 5,049,867 | 9/1991 | Stouffer . | |
| 5,079,538 | 1/1992 | DeFino et al. ......................... | 340/426 |
| 5,157,375 | 10/1992 | Drori et al. . | |
| 5,216,406 | 6/1993 | Bechtle .................................. | 340/426 |
| 5,278,547 | 1/1994 | Suman et al. ...................... | 340/825.31 |
| 5,315,285 | 5/1994 | Nykerk .................................. | 340/426 |
| 5,319,364 | 6/1994 | Waraksa et al. ................... | 340/825.31 |

OTHER PUBLICATIONS

Audiovox, Model PRO 92BT Owner's Manual/Transmitter Programming Guide.
Audiovox, Model PRO 9249 Owner's Manual/Active Passive Operation Model PRo 9249 Installation Manual.
Audiovox, Model PRO–9149 Owner's Manual, Passive Operation Model PRO–9149 Owner's Manual, Active Operation Model PRO–9149 Installation Guide, Keyless Entry Auto Security System.
Audiovox, Model PRO–9144/Owner's Manual/Active Operation Model PRO–9144/Remote Control Auto Security System, Installation Manual Model PRO–9144/Owner'Manual/Passive Operation.

*Primary Examiner*—Brent A. Swarthout
*Attorney, Agent, or Firm*—Graham & James LLP

[57] ABSTRACT

An upgrade method and apparatus for both remote and key-operated two-step vehicle security systems is disclosed. The upgrade blocks attempts to disarm the alarm circuit when the vehicle is armed and unlocked improperly.

The upgrade can be added to existing systems regardless of the polarity of the signals used therein. Improved power-up and remote control features can also be added as a part of the upgrade.

34 Claims, 7 Drawing Sheets

VEHICLE SECURITY SYSTEM UPGRADE

This application is a continuation of Ser. No. 282,628, filed on Jul. 29, 1994, which application is a continuation-in-part of application Ser. No. 08/141,195, filed on Oct. 21, 1993 both abandoned.

BACKGROUND OF THE INVENTION

1. Field of the Invention

The invention relates generally to vehicle security systems and particularly to vehicle alarm circuits.

2. Discussion of the Prior Art

Many automobiles have remote-control door locks. As the driver approaches an automobile when the doors are locked and the system is armed, the driver activates a small transmitter on the automobile ignition key, or attached to the key, and in prior art systems this causes the system to disarm and all of the automobile doors to unlock.

Recently there has been a spate of crimes where thieves hide next to an automobile, and when the driver unlocks the doors with the door unlock transmitter, the thief comes out of hiding and enters through one of the doors, usually the front passenger door. The driver then either flees, or is accosted in the automobile by the thief. Thus, there is a need to prevent thieves from entering the automobile.

Furthermore, in the United States this past year more than 1.5 million attempted or actual automobile thefts and forced entry to automobiles were reported to the police, an average rate of 1 entry every 20 seconds. In an attempt to reduce the high incidence of break-in and theft, many new cars are fitted with security systems including alarm circuits. Older cars without such systems are having systems added. Existing systems are being upgraded by adding new features and improving those already installed.

However, professional criminals who encounter lock-and-alarm security systems, have become adept at bypassing the alarms and rendering the security systems ineffective. Thus, there is a need for better systems which are more difficult to avoid, and which will successfully deter even the most sophisticated criminals.

After-market security systems manufacturers have tried to come up with the perfect upgrade package to convert factory-installed keyless entry systems into convenient and effective lock-and-alarm security systems. However, they have used single wire alarm control inputs in their systems. This has resulted in the manufacture and stocking of many different S.K.U. (stock keeping unit) categories, due largely to the many different types of door lock switching methods used by auto manufacturers.

Furthermore, whether factory-installed or sold as after-market units, conventional keyless-entry upgrades are often particularly easily defeated. One reason for this is that they are typically armed by moving a door lock switch and disarmed by moving a door unlock switch. Thus a thief who breaks a side window while the car is locked and armed can disable the siren and other alarms by merely moving a switch on the inside of the door.

In installing lock-and-alarm security systems in the field, after a vehicle leaves the factory, it is customary for the installer to disconnect the automobile battery prior to installing the security system. After the system, with its sensors, outputs, and wiring is installed, then the battery is reconnected. This installation procedure is, in itself, a problem.

Once a new or modified alarm circuit is in place, and whenever voltage is applied to the alarm circuit, e.g., when the battery has run down and is subsequently recharged, the alarm circuits come on not just armed but loud: the siren went off! Prior art security systems also automatically did one other thing that is highly undesirable at such a time moment: the doors locked. Only too often the owner or mechanic then belatedly discovered that the keys were in the ignition, locked inside the automobile. If no extra set of keys is available, that is a more than a minor inconvenience.

The noise of vehicle alarm sirens is not just embarrassing, it may be illegal. Sirens going off in a garage or repair shop is not only disturbing, such noise may be a safety or zoning standards violation, especially in shops that install several systems each day.

Finally, in prior art security systems, the number of functions which can be operated from a remote control transmitter has been increased in two ways. One approach has been to increase the number of buttons on the transmitter, each button operating a different function. Another approach has been to first store and then transmit the desired codes.

The prior art store and transmit operation is best explained by an example: using a two-button transmitter, the user may depress the first button three times, and then depress the second button, as a send button. For a different function, the user might depress the first button four times, and then depress the send button. The receiver or controller then decodes the signal.

These prior art techniques require replacement of transmitter and receiver hardware, and are complicated to operate. Such sets of command codes are sometimes so confusing as to be unusable without written instructions.

SUMMARY OF THE INVENTION

A vehicle security system upgrade for a vehicle in accordance with the present invention includes an improved arm/disarm control circuit connected to a two-step door lock mechanism. The control circuit disables the disarm function when the vehicle's doors are unlocked simultaneously, rather than sequentially; and an alarm circuit connected to said disarm control circuit so as to be disarmed in response to a disarm signal from said disarm control circuit.

A vehicle security system in accordance with one embodiment of the present invention also includes a door lock switch connected to provide lock and unlock electrical signals and a two-step door lock mechanism connected so as to sequentially unlock one door of the vehicle in response to a first unlock signal from the door lock switch, and then unlock a second door of the vehicle in response to a subsequent unlock signal from the door lock switch. The security system also includes a central control door lock switch connected to the two-step door lock mechanism so as provide signals to simultaneously unlock the first and second doors.

The alarm circuit may include multiple sensor inputs for detecting events such as voltage changes and vibration, and outputs to operate given alarm circuit devices, such as an ignition disconnect, as well as sirens and flashing lights. The alarm circuit is usually on as long as the automobile battery is connected. Some units may also include back-up batteries.

The alarm circuit is either armed, i.e., ready to activate an alarm output in response to a given event, or disarmed. When the system is armed, a sensor input produced in response to a given event triggers predetermined alarm functions.

The two-step door unlock feature prevents thieves from entering the automobile. In accordance with the present invention, as the driver approaches the automobile when all doors are locked and the system is armed, a first activation of the transmitter disarms the alarm circuit but unlocks only the driver's door. If the driver wishes to unlock all the doors, then the transmitter is activated twice, but in rapid succession, e.g., within 5 seconds. The first activation unlocks the driver's door and the second unlocks all the doors, if it occurs within that interval. However, a second activation of the transmitter after that interval will lock all doors and arm the system.

Thus, as the driver approaches the automobile, only the driver's door is unlocked, initially. Should a suspicious person be lurking near the automobile, the present invention bars entry through the other three doors and, in addition, provides the driver two options: 1) The driver can enter the unlocked driver's door and drive away, leaving the suspicious person locked out. 2) The driver can lock all doors and rearm the system, leave the area, and return with help. Either way, the driver is more secure with this security system in accordance with the present invention.

Thus, an object of the invention is to provide a system for thwarting would-be thieves who hide near parked automobiles and enter an automobile when the driver unlocks all vehicle doors with a transmitter.

Another object of the invention is to provide both security and convenience for the driver when unlocking doors of a parked automobile, by allowing the driver to selectively unlock either only the driver's door, or all the doors, and to quickly relock all the doors and rearm the alarm circuit, if necessary.

The present invention also provides an improved method and apparatus for the installation, maintenance and modification of the vehicle's security system, simplifying the job of reconnecting the battery in automobiles which have alarm circuits while also preventing automobile theft.

To overcome the shortcomings of the prior art, the present invention provides a novel circuit for disconnecting the door lock system's automatic door lock feature when the battery is first connected or reconnected in the car. The siren may also be temporarily disabled when voltage is first applied to the circuit.

A further advantage of this aspect of the invention is its anti-theft feature. A typical attempted theft of an automobile follows a particular sequence: 1) Disconnect the battery. 2) Turn on the ignition, either by removing a wire from its accustomed place and jumping it to another part of the circuit, or cutting the entire ignition lock out and then jumping a wire. 3) Reconnect the battery.

In accordance with the present invention, when a thief reconnects the battery, the thief is not immediately aware that the alarm circuit is armed, since no siren sounds. But the alarm circuit is armed, and the starter is automatically disconnected. When the armed system is triggered by any event, such as a vibration sensor detecting improper opening of the doors, the alarms suddenly go into action.

When the starter motor is disconnected by the armed security system, in accordance with the present invention, the thief must spend additional time connecting the starter before proceeding to steal the car. Typically, a thief must first find the starter relay and by-pass it, again disconnecting the battery in the process, before the starter will operate. This may require more time than a thief has. The longer it takes to steal an automobile, the greater the chances of the thief's being caught or interrupted in the theft, particularly while lights are flashing, sirens are sounding, and other security devices are active.

Thus a further object of the present invention is to provide a lock-and-alarm security system upgrade that can be more easily and safely installed. Also, a system installation that can be completed without unwanted noise from the system and without the automobile locking itself.

Another object is to permit a battery to be reconnected or recharged during maintenance work without the unwanted noise, and without the mechanic being locked out with the keys inside the automobile and the siren sounding.

Another feature of the invention is an improved remote control method and apparatus that increases the number of functions that can be operated from a conventional remote control transmitter having two buttons and three channels. The transmitter can be used to control such additional functions from both inside or outside the automobile.

In the remote control receiver, according to the invention, incoming signals on channels 2 and 3 may be used to perform two functions each, depending on whether or not the vehicle is armed or disarmed. For example, if the system is in the armed state, and a signal is sent on channel 2, then the alarm circuit will first determine if the system is armed, and, if so, will then provide a first preprogrammed output. If the system is disarmed when a signal is sent on channel 2, the alarm circuit will sense the disarmed state and provide a second preprogrammed output.

A signal can be sent on channel 3 by simultaneously depressing both buttons. Then, if the system is in the armed state, the preprogrammed output might turn on the headlights but, if disarmed, it might lower the windows.

Thus, a further object of the invention is to provide split-channel remote control commands, in which the number of different commands can be executed from the transmitter is increased. In particular, to increase the number of such commands with a conventional two button transmitter.

Another feature of the invention is an improved alarm circuit for use with a two-step keyless or door lock system. In two-step key-entry system, a first turning of the key in the door, unlocks the driver's door, and a second turning of the key unlocks all the doors. In the keyless system a first signal from the transmitter unlocks the driver's door, and the second signal, if received within a predetermined time, will unlock all doors. In remote control door lock systems, the function receiver is analogous to that function of the keyswitch. Two-step systems were easily defeated, however, because they usually were armed and disarmed by connection to the door lock wire and the door unlock wire, respectively. A thief who breaks in to the car can easily disarm these systems. The thief who breaks a window can simply reach in and push the central control door lock switch to the un lock position and it will disarm the security system, in some vehicles.

Thus, another object of the invention is to thwart a thief's attempts to disarm the alarm circuit in a vehicle having a two-step door lock system. In particular, to prevent the thief from disarming the alarm circuit by operating the automobile's electrical central control door lock switch.

Another object of the invention is to provide a circuit which may be added to an existing two-step lock-and-alarm security system and to make the system more secure.

Another object of the invention is a method for upgrading an existing two-step lock-and-alarm system to improve the performance of the alarm circuit and to maintain the integrity of the system.

Still another aspect of the invention is an arming circuit adapted to be added to or included with an alarm circuit that is simple to install and may be used in many different types of security systems for vehicles having different battery types and different electrical configurations.

In accordance with the present invention, a single alarm circuit upgrade is available for many different types of security systems and battery types and electrical configurations, while in the prior art different upgrade units were required for different battery and electrical configurations.

A further object of the invention is to provide a universal circuit to be used for arming a lock-and-alarm security system and which is easy to install and suitable for a variety of security systems having different battery types and different circuit configurations. Thus, only one type of circuit need be stocked in inventory different for installation on many different types of vehicles.

A BRIEF DESCRIPTION OF THE DRAWINGS

The features and advantages of the present invention will be better understood when the Detailed Description of the Preferred Embodiments below is considered in conjunction with the drawings provided, wherein:

FIG. 4a is a schematic circuit diagram of a lock-and-alarm security system upgrade connected to the door lock system of FIG. 3 in accordance with the present invention;

FIG. 4b is a truth table for FIG. 4a;

FIG. 4c is a logic flowchart for FIG. 4a;

In the drawings, like elements are assigned like reference numerals.

DETAILED DESCRIPTION OF THE PREFERRED EMBODIMENTS

Figure 1:
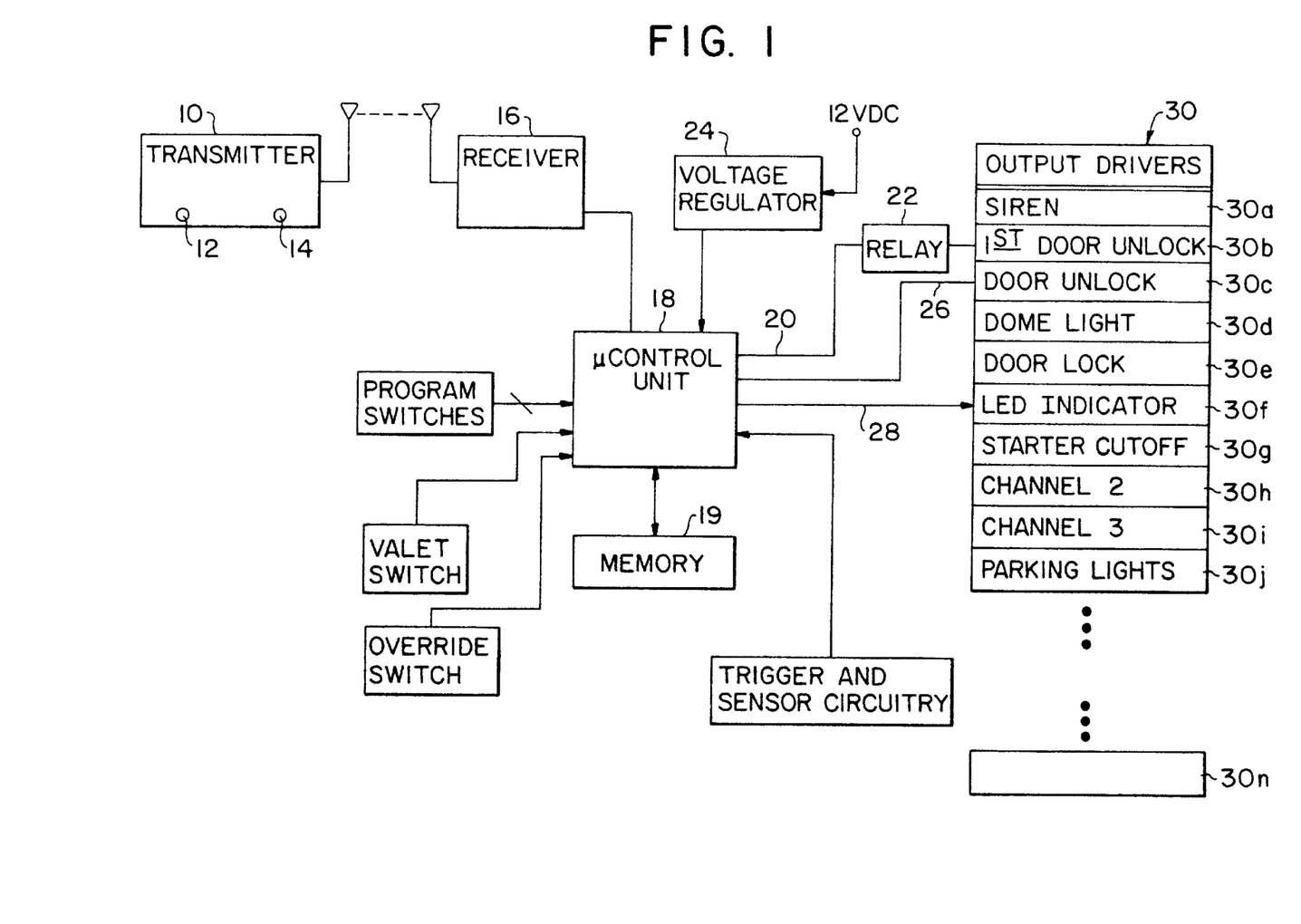
FIG. 1 is a schematic block diagram of a lock-and-alarm system for an automobile that provides split-channel remote control.

FIG. 1 is a schematic block diagram of a factory-installed lock-and-alarm security system having the desirable operational features that are provided as an upgrade in accordance with the present invention. A transmitter 10, which is typically held by the user has a pair of operator operated buttons 12 and 14. Activation of a first button 12, produces a pulse code modulated (PCM) signal, e.g., 16 bits transmitted in the 275–310 MHz range. Activation of a second button 14 produces a different PCM signal which may also be 16 bits long. Simultaneous activation of both buttons 12 and 14 produces a third, different PCM signal, perhaps also 16 bits long. Presently, the signal is a 16-bit PCM signal, but other signal lengths and other coding may be used.

Inside the automobile is a receiver 16 which may be any convenient or conventional receiver, of the kind which receives the signal from transmitter 10, amplifies the signal, demodulates, and passes the signal to a microcontroller unit 18.

The microcontroller unit 18 receives the incoming signal from receiver 16 and compares or verifies the coded signal with a code stored in a memory 19, which may be an E²PROM (not shown) in the microcontroller. If the code is verified, then an output signal is provided on an output terminal and lead 20 of the microcontroller. This output signal is typically a pulse of sufficient duration and amplitude to operate a relay 22 which is shown in the drawings between the microcontroller unit 18 and a first door or driver's door unlock control 30b. The relay 22 is shown external to the microcontroller unit, although it may actually be on the same circuit board as the microcontroller unit circuit board, or part of the microcontroller unit 18.

A 12-volt DC voltage source (not shown), which may be the automobile battery, supplies power to a voltage regulator 24 which is connected to the microcontroller unit 18, and the relay 22. The output signal from the micro-controller unit 18 on lead 20 activates relay 22 which then controls the driver's door lock. The door unlock mechanism is conventional.

When the transmitter is twice activated within a short period of time, e.g., within 5 seconds, the second signal is used to unlock all the doors in the automobile. Here, activation of button 12 produces the same signal that was previously transmitted from transmitter 10 to receiver 16 where it flows through to the microcontroller unit. Time delay measurements are carried out in the microcontroller unit, and if the second signal is received within a predetermined time, e.g., a 5-second period, then a signal goes out from the unit 18 on a lead 26 to a door lock/unlock control 30c to unlock all the doors in the automobile.

In practical embodiments, the microcontroller unit 18 will have a plurality of outputs, which drive or control a plurality of output drivers 30 and 30a . . . 30n. Output from control unit 18 are transmitted to the output drivers 30 over a plurality of leads which are typically a wiring harness, shown here with legend 28. The lead 26 is included within the plurality of leads 28. Each of the leads 28 extends to the appropriate driver 30.

An activation of the button 12 after the predetermined time period, e.g., after the 5-second time interval, causes the microcontroller unit 18 to generate a series of control signals or pulses at its outputs and over conductors 28. These include an output that locks all the doors 30e; and one internal to the microcontroller unit 18 that arms the system. Arming the system causes a flash of the automobile parking lights, on output 30j, a single chirp at output 30a, and the status indicator e.g., a flashing red LED at output 30f visible inside the car. Additionally, arming of the system causes the starter to be cut off, output 30g, and if the interior automobile light is on, to turn it off, output 30d. This is shown schematically in the drawing as being sent to the output drivers 30 and 30a–30n via the bus 28.

The 5-second time delay between the first and second signal has been found to define a convenient and practical time window. However, longer or shorter time periods may be used e.g., in the range of 2.5 to 12.5 seconds.

Figure 2:
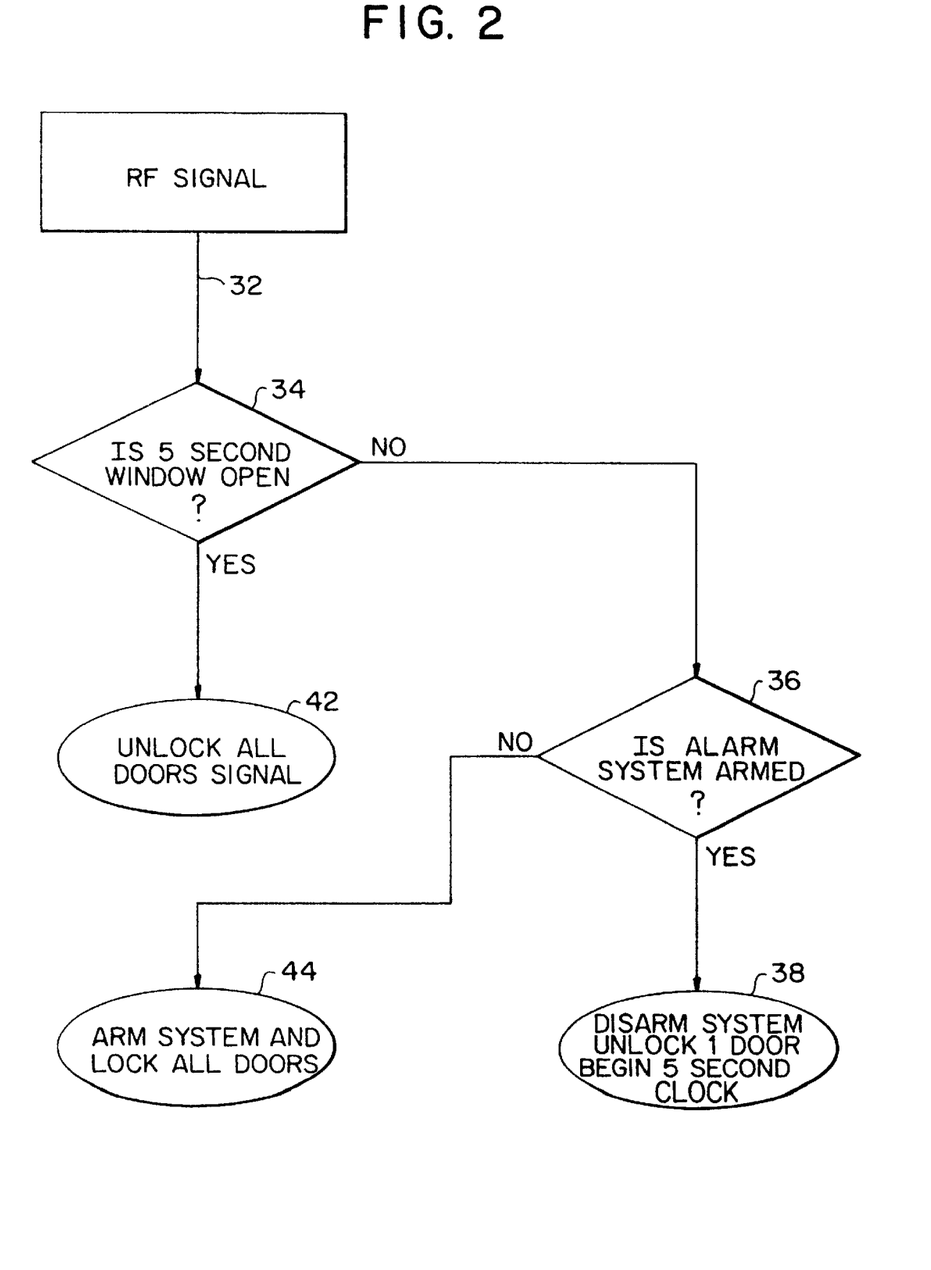
FIG. 2 is a logic flowchart of the two-step door lock of FIG. 1.

FIG. 2 is a logic diagram, or flowchart, illustrating some of the functions performed by the microcontroller unit 18 shown in FIG. 1. After the signal from the transmitter 10 is received and compared with the codes in memory 19, microcontroller unit 18 generates an internal signal at 32 to a decision box 34. Here, a decision is to be made is the unit in the 5-second time window, i.e. was a signal previously received within 5 seconds? If the system is not in the 5-second window, then it proceeds as shown in the flowchart to the next decision box 36 and the interrogation "Is the system armed?" If the system is armed, then three instructions are given, as shown at command output box 38: 1) a disarm command is produced internal to unit 18; 2) a command that unlocks one door is output on lead 20 to relay 22 to unlock one door at 30b; and 3) a command internal to the microcontroller unit 18 that opens a 5-second window.

Alternatively, if the signal arrives on 32 while the 5-second time window is open, then a decision is made in 34 and control signals are set to unlock all the doors 42.

The third possibility is if the signal 32 comes in, to decision block 34 and the 5-second window is not open, and the system is not armed 36, then the microcontroller issues two commands 44: 1) a command to an output driver 30e that locks all doors; and 2) a command internal to the microcontroller 18 that arms the system.

It will be appreciated that any convenient or conventional microcontroller unit 18 may be employed and programmed in accordance with the logic flowchart in FIG. 2 and the subsequent flowcharts. Alternatively, a dedicated circuit with gates, clocks, and decision circuits may be used. The choice between a programmed microcontroller and a dedicated circuit is a matter of economics depending upon the anticipated or actual quantity of units and systems to be manufactured. For large production runs, the dedicated I.C. circuit would appear advantageous. It should be understood, however, that the invention is not limited to a particular embodiment, as economic, engineering and technical conditions will dictate the choice.

Conventional Door Lock Systems

Figure 3:
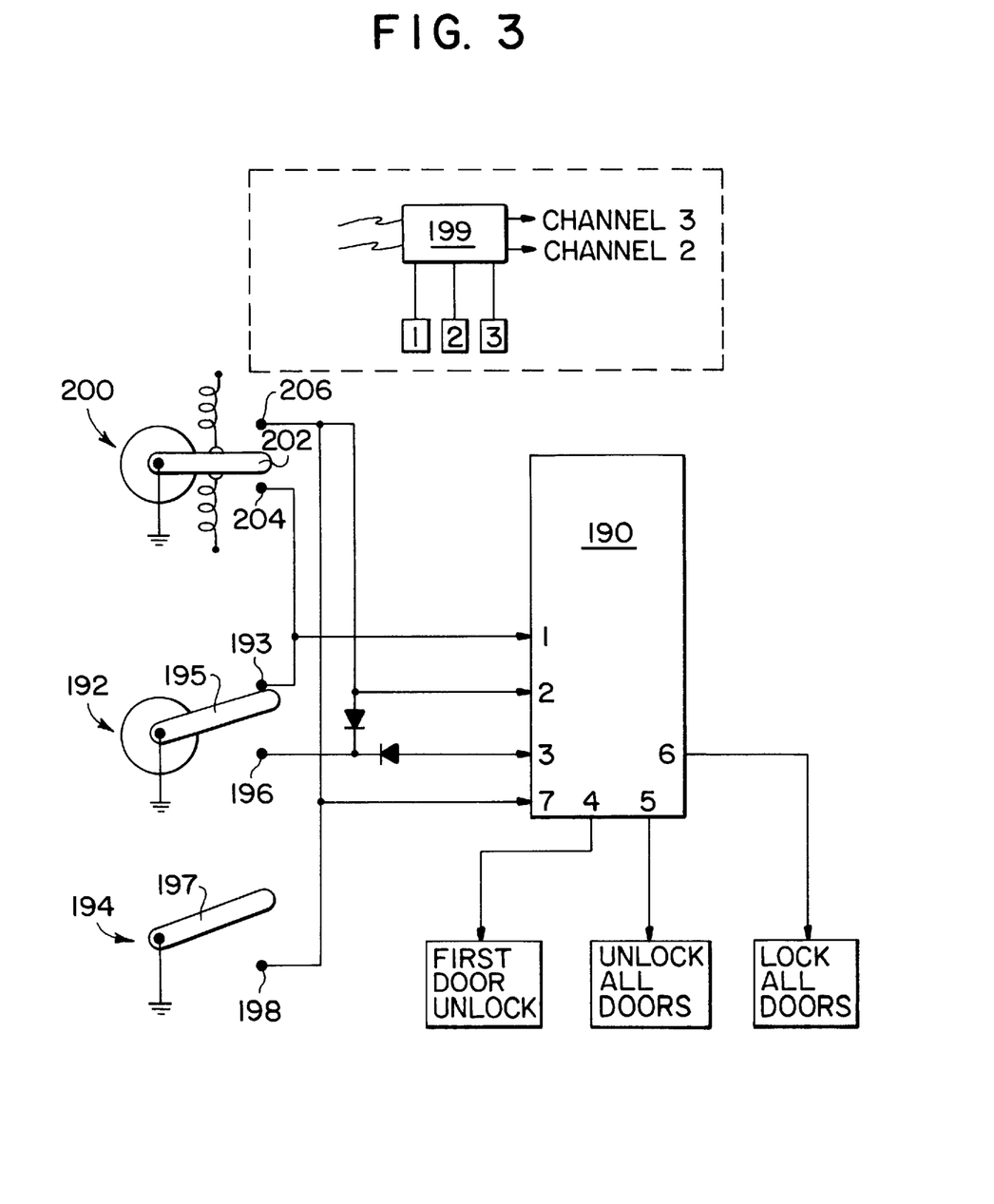
FIG. 3 is a schematic circuit diagram of a two-step door lock system installed in a vehicle that has no alarm circuit, in accordance with the prior art.

Many security features of the vehicle lock-and-alarm system described above may be added as an upgrade to a conventional door-lock control circuit. FIG. 3 is a schematic circuit diagram showing a conventional, mechanical door-lock control circuit. This circuit employs a conventional central door lock control switch and door lock keyswitches, and a conventional door-lock control CPU.

The door-lock control CPU 190 has four input pins 1, 2, 3 and 7; and three output pins 4, 5 and 6. A signal applied to input pin 1 of the CPU 190 locks all vehicle doors by producing a signal on output pin 6. A signal applied to input pin 2 unlocks all doors by producing a signal on output pin 4. A signal applied to input pin 3 unlocks one door, usually the driver's door, by producing a signal on output pin 4. The mechanical key-operated lock switch 192 is selectably connected to these inputs of the CPU 190 through switch terminal 193 or switch terminal 195 by a rotatable contact arm 195.

The signal on input pin 7 is produced by a door lock position sensor 194, which indicates the position of the door lock keyswitch. The movable contact arm 197 of this sensor switch 194 is mechanically linked to the contact arm 195 of the door lock keyswitch 192.

In FIG. 3 the vehicle's doors are locked. Both the keyswitch 192 and sensor switch 194 are in the locked position. The contact arm 195 grounds terminal 193 on the keyswitch 192 when the key was rotated in the door lock. At that same time, the contact arm 197 on the door-lock sensor switch 194 disconnected input pin 7 from ground.

When the key is first turned to lock the vehicle door, the keyswitch 192 moves the sensor switch 194 into contact with terminal 198. The first time ground is applied to pins 2 and 3 through terminal 196 and contact arm 195, the contact arm 197 of the sensor switch 194 also contacts terminal 198, grounding pin 7. The CPU 190 then produces a signal on pin 4 that unlocks one door, usually the driver's door. The sensor switch 194 then sets up the CPU, allowing the second unlock pulse to unlock all doors.

Turning the key in the door lock a second time grounds terminal 196 again, while 198 remains grounded. Logic within the CPU 190 distinguishes between the first and second time that ground is applied to pins 2 and 3 simultaneously while the ground is applied to pin 7, in any conventional or convenient manner known in the art. The grounding of pins 2, 3 and 7 now causes the CPU 190 to produce a signal on pin 5, which unlocks all doors.

Although FIG. 3 shows a mechanical door lock, it should be noted that the vehicle may have a numerical keypad or an RF remote-control receiver unit which connects to the factory-installed door lock CPU. The response of the CPU will be substantially the same.

In such keyless systems, signals may be supplied to input pins 1, 2 and 3 of the CPU 190 from a radio-frequency (RF) remote control receiver unit within the vehicle, such as the receiver 199 shown in FIG. 3. The receiver unit 199 is activated by signals from an RF transmitter (not shown). The CPU 190 responds to the two-step "unlock" command sequence regardless of whether the command signals are carried by wires or radio waves.

The keyed-entry door lock system shown in FIG. 3 also has a conventional electrical central door lock control switch 200. The central control switch 200 has a contact arm 202 and two switch contacts 204 and 206. Contact 204 is connected to input pin 1 and contact 206 is connected to input pins 2 and 7 of the CPU 190.

This central control switch 200 is typically on the inside surface of the vehicle door, just below the bottom of the window. Alternatively, the central control switch 200 is sometimes mounted between the two front seats, or on the door near the arm rest to the left of the driver. Typically, momentarily lifting this central control switch 200 unlocks all the doors, and momentarily depressing it locks them.

When the contact arm 202 of the central control switch 200 is rotated downward and contacts terminal 204, input pin 1 is grounded, and the CPU 190 to produces a signal on output pin 6, locking all doors. Similarly, when the contact arm 202 is rotated upward and contacts terminal 206, grounding input pins 2 and 7, the CPU 190 produces a signal on output pin 5 that unlocks all the doors.

Key-Entry Door Lock System Upgrades

If the door lock system shown in FIG. 3 is upgraded by the addition of an alarm circuit, the alarm circuit could be controlled mechanically through the keyswitch and central control switch. The alarm circuit could then be connected directly to terminal 204 or 193, to arm, and terminal 206 or 196 to disarm the alarm circuit. However, the alarm circuit may also be controlled by the CPU 190. CPU output pins 4 and 5 would then both unlock the doors and disarm the alarm circuit; and output pin 6 would lock the doors and arm the alarm circuit.

Figures 4A, 4B:
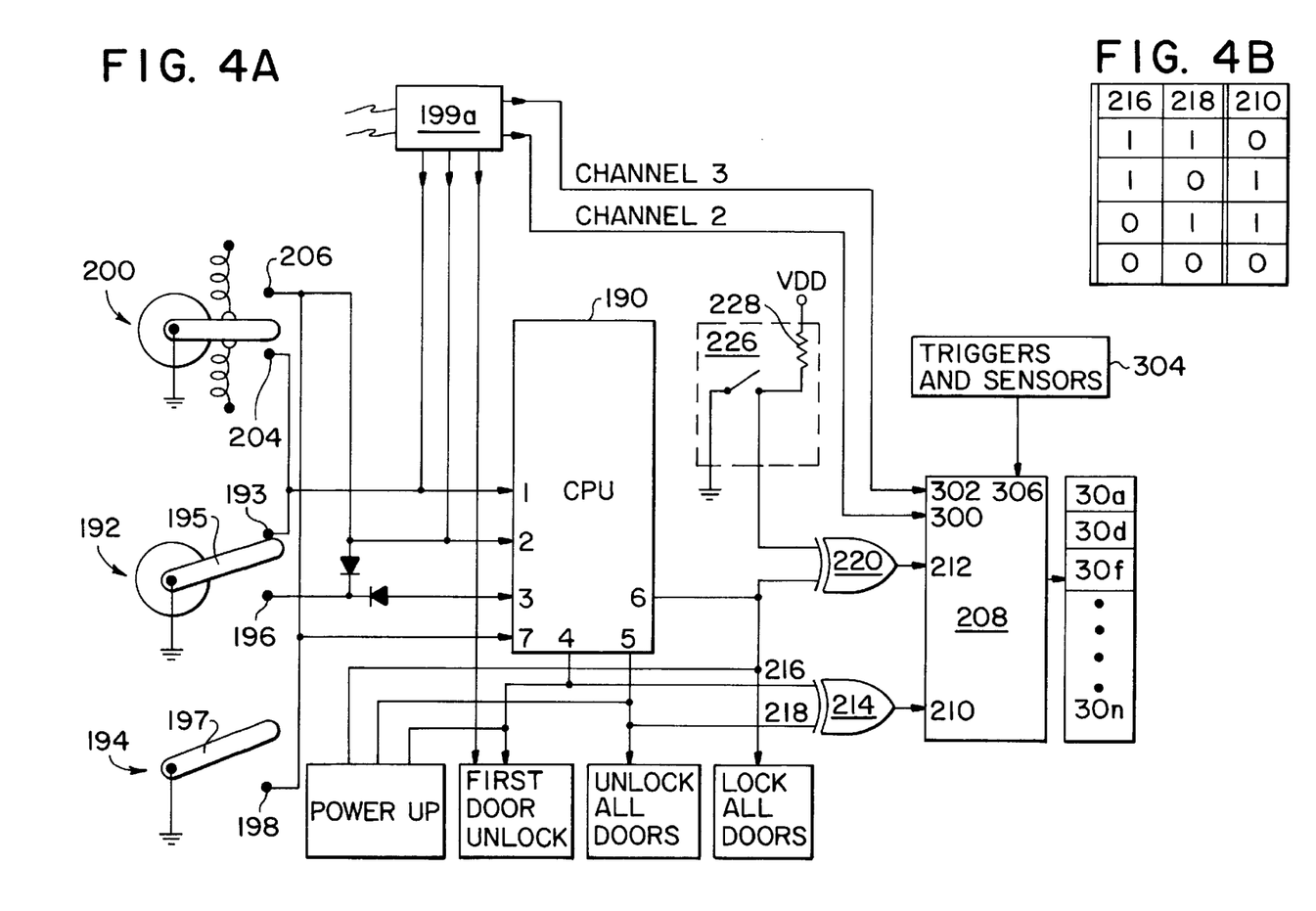

In many upgraded systems, however, all a thief has to do is to lift the central control switch 200 to disarm the alarm circuit: lifting contact arm 202 grounds terminal 206 and input pins 2 and 7. The CPU 190 then immediately unlocks all the doors and disarms the alarm circuit. The thief only needs to reach in through the driver's side window to unlock the vehicle and silence any alarms. FIG. 4a shows a preferred embodiment of a door lock system upgrade in accordance with the present invention, that thwarts thieves' attempts to use that central door lock control switch to disable the vehicle's alarm circuit.

In FIG. 4a, the upgraded circuit includes an alarm circuit 208 that is connected to the door lock system of FIG. 3 to provide additional security functions. The alarm circuit may be a programmable microcontroller, or a custom-fabricated, hard-wired circuit, as noted above.

All alarm circuit functions are disarmed by a "disarm" input 210 and armed by an "arm" input 212 of the alarm circuit 208. The starter motor is disabled when the security system is armed, as in FIG. 1. The disarm input 210 is connected to the output of an EXCLUSIVE OR gate 214 having one input 216 connected to output pin 4, and the other input 218 connected to output pin 5 of the door lock CPU 190.

Thus, when the vehicle is locked and the alarm circuit is armed, turning the key once in the door lock on the driver's door produces a signal on output pin 4, but no signal on output pin 5. Since gate 214 is an EXCLUSIVE OR gate and there is a signal on only one input, this rotation of the key in the switch also provides a signal to the disarm input 210 of the alarm processing unit 208, and disarms the alarm circuit.

A second rotation of the key in the switch 192 produces a signal on output pin 5, but no signal on output pin 4. The signal on output pin 5 unlocks all doors and supplies a signal to input 218 of gate 214. Since there is then a signal on input 218 and no signal on input 216, the EXCLUSIVE OR gate 214 again provides a signal to input terminal 210. This second disarm signal merely confirms that the alarm circuit 208 is disarmed.

However, in accordance with the present invention, in the event anyone forces entry and attempts to unlock the vehicle or disable its alarms using the central control switch 200, terminal 206 grounds both input pins 2 and 7, but not pin 3. The pattern of inputs causes the CPU to produce an output signal on both output pin 4 and output pin 5. These signals appear on inputs 216 and 218 of the EXCLUSIVE OR gate 214, preventing the gate 214 from producing a signal.

Thus, when entry is effected by force, the signal on output pins 4 and 5 produced by lifting the central control switch 200 does unlock all the vehicle's doors simultaneously. However, because no signal is produced by the EXCLUSIVE OR gate 214 is disabled, and the alarm circuit is not disarmed. The system remains armed, sirens are not silenced. Movement of the control switch 200 while the system is armed merely confirm the arming of the system.

FIG. 4b is a truth table showing the output that gate 214 supplies to the disarm input 210 in response to different combinations of signals on inputs 216 and 218. On the table, ground potential is shown as having the logical or binary value "1" (one). VDD is typically some voltage supplied by the vehicle's battery, and that voltage is shown here as having the logical or binary value "0" (zero).

The second row shows an input signal on pin 4 and no signal on pin 5, i.e., unlock the driver's door only, and the output of the gate is a 1 so that the system is disarmed. The third row shows the situation where a signal is received on pin 5 at input 218, but not on pin 4 and there is an output signal on input 214, again disarming the system.

The EXCLUSIVE OR gate 214 used in accordance with this embodiment of the invention provides an advantageous symmetry in the truth table, which permits the upgrade circuit to accommodate a door lock CPU that uses VDD as the signal, rather than ground. When ground signals appear simultaneously, in row 1, the result is the same as when VDD remains on both inputs, in row 4: there is no output from the gate 214. The polarity of two signals may be reversed, various voltage levels may be used, the binary "0" and "1" notations may reversed, all without affecting the logical result in this table.

Figure 4C:
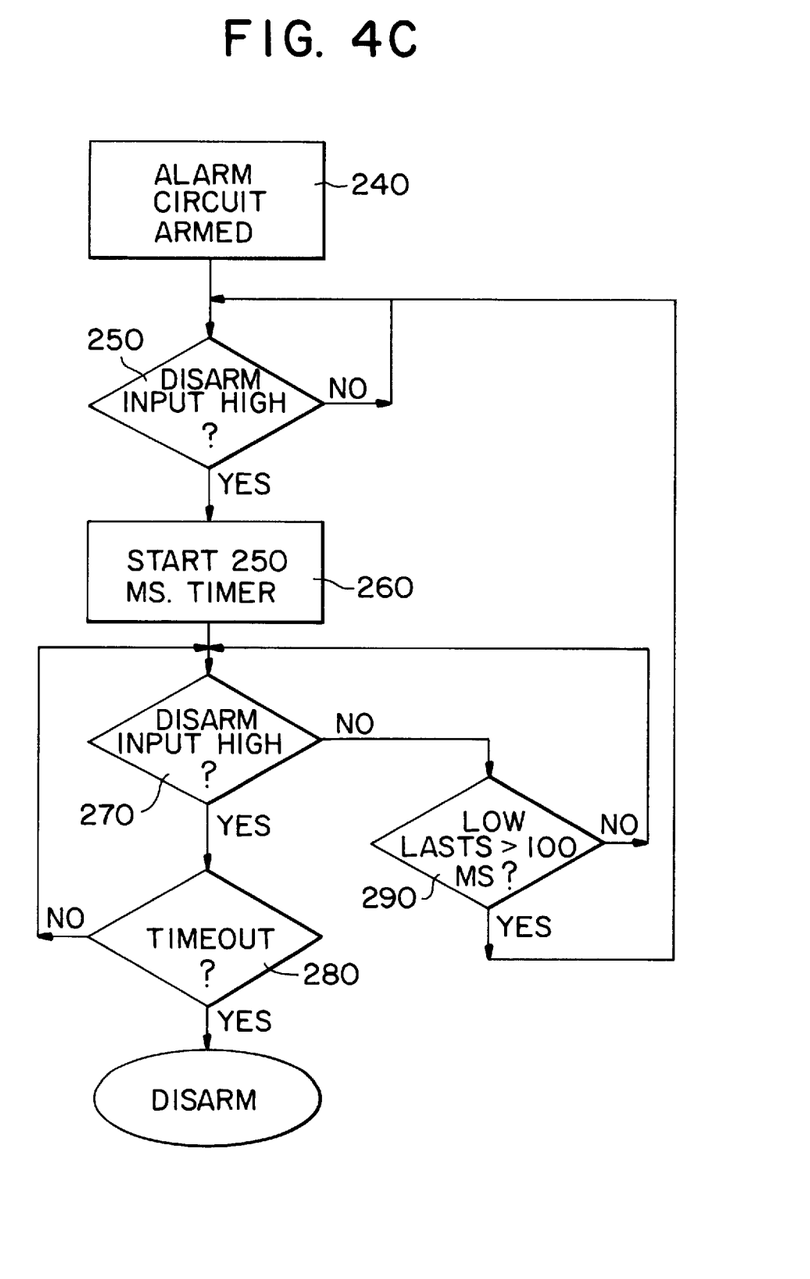

FIG. 4c is a logic flowchart of the circuit of FIG. 4a. Because of possible variability in the delay before outputs change on pins 4 and 5 in FIG. 3 after signals change on input pins 2, 3 and 7, and the possible occupance of spurious switching pulses, it is desirable to define a predetermined latency period for the disarm operation in alarm circuit 208 and a minimum recognizable coincidence time for between simultaneous input signals at gate 214 in FIGS. 7a and 7b. The preferred minimum coincidence period is approximately one hundred milliseconds, as noted in FIG. 4c.

In FIG. 4c, the alarm unit 208 is armed, i.e., the inputs 216 and 218 both have the logical value "0", in status box 240 at the top of the chart. When the logical value of the disarm input 210 changes to "1" the change is detected at decision block 250, which then starts a 250-millisecond timer at block 260. If a "0" is detected at decision box 270 before the 250-millisecond timer times out at decision block 280, the alarm circuit 208 checks the duration of that "0" input signal at decision block 290.

If no "0" disarm input signal lasting longer than 100 milliseconds is detected before the timer finally times out at decision block 280, the alarm circuit 208 disarms, or confirms that it is disarmed. If a "0" value lasting longer than 100 milliseconds is detected, the disarm attempt is aborted.

A minimum coincidence period of 100 milliseconds and latency of 250 milliseconds have been selected to accommodate the operating characteristics of devices familiar to the inventors. Shorter or longer periods may be used to optimize the performance of the alarm circuit in upgrades where the existing door lock microcontroller's actual practical working characteristics require it, because of peculiarities of its design or manufacture.

The coincidence and latency periods need be no longer than what is sufficient to allow the alarm processor to distinguish signals that OR gate 214 produces in response to repeated actuation of the central control switch 200 from signals the gate 214 produces in response to actuation of the keyswitch 192, with allowance for differential delay in the appearance of nominally coincident signals from the CPU 190. This also reduces the alarm circuit's sensitivity to normal signal artifacts, such as those produced by contact bounce.

Further logical adaptability of this upgrade unit is provided by a second EXCLUSIVE OR gate 220 connected to the "arm" input 212 of the alarm processing unit 208. One input 224 to the gate 220 is connected to a polarity selection switch 226. The second input 222 to this gate 220 is connected either input pin 1 or output pin 6 of the CPU 190, i.e., pins carrying the lock-all-doors signals that arm the system. The polarity switch 226 permits an installer to invert the logical value that is produced at the output of gate 200 in response to signals applied to input 222 of the gate. The polarity selection input 224 is connected to the reference voltage VDD through a resistor 228, and to ground through a switch 228, preferably a DIP switch that is conveniently situated for use during installation of the circuit.

The polarity switch 226 permits the EXCLUSIVE OR gate 220 to connect the signal provided by either input pin 1 or output pin 6 to the arm input 212 of the alarm circuit 208 without regard to whether the signal on that pin has a "1" or "0" logical value. Because the same circuit can be used for either type of installation, only one circuit need be stocked.

Keyless Door Lock System Upgrades

The circuit shown in FIG. 4a, also further provides an improved keyless-entry security system upgrade package for vehicles that have a previously-installed two-step door lock system. The add-on three-channel receiver provided with this upgrade is preferably connected as shown in FIG. 4a, so that the driver's door is locked directly by the receiver 199. The CPU inputs for locking and unlocking all doors are connected to the other two outputs of the receiver 199a.

Conventional keyless-entry lock-and-alarm upgrades, whether factory-installed or sold as after-market units, pose a problem for the security system manufacturer in that they are easily defeated. One reason that conventional keyless entry upgrade units are easy to defeat is that they are typically armed by moving a door locking switch and disarmed by moving a door unlocking switch. Thus a thief who breaks a side window can disable the siren and other alarms by moving a door lock switch, such as the central control door lock switch, to its unlocked position.

In accordance with the present invention, lifting the central control switch 200 unlocks all doors, as in the prior art. However, when the system responds to the ground applied to terminal 206 of the central control switch 200 in accordance with the present invention, signals are produced on both inputs to the EXCLUSIVE OR gate. The thief who unlocks the driver's door lock using the unlock wire rather than the keyswitch, will produce a 1:1 code at the inputs to the EXCLUSIVE OR gate, disabling that gate and preventing the alarm circuit from being disarmed. The thief is defeated; not the security system.

The only way to disarm the alarm circuit is to either use a remote transmitter or to use a door key. Either the remote control receiver unit or the keyswitch unit will produce a signal on only one of the unlock output pins 4 and 5, and the 1:0 or 0:1 signal code that the EXCLUSIVE OR gate needs to disarm the system and silence the alarms.

In two-step keyless-entry systems, the remote control receiver unit 199 first sends an unlock pulse via pins 3 and 4 of the CPU to the first door, i.e., the driver's door. If a second unlock command is transmitted, an unlock pulse is sent via pins 2 and 5 to all doors. As noted above, many factory-installed key-entry door locks operate in a similar fashion, i.e., turn the door key once to unlock only one door, turn the key a second time to unlock all doors. Thus, the present invention provides an improved lock-and-alarm system upgrade for either key-entry or keyless-entry two-step door lock systems that is very difficult to defeat.

After-Market Upgrades

FIG. 3 shows a two-step, key-entry door lock system having two factory-installed lock control switches. One is a typical mechanical door lock keyswitch 192. When the keyswitch 192 is turned to the unlock position one time the first door, usually the left front door, the driver's door, is unlocked. Also, a mechanical link connected to door lock sensor switch 194 is moved, closing that sensor switch. The sensor switch sets up the CPU in this system, allowing the second unlock pulse to unlock all doors.

When pin 7 on the CPU 190 is not grounded by the sensor switch contact 197, the CPU 190 simply produces signals on pins 4 and 5 in response to inputs received on pins 3 and 2, respectively. Thus, the door lock system CPU of FIG. 3 may be controlled remotely, as well as by the keyswitch 192.

When the keyswitch is first moved to unlock the doors, it grounds pins 2 and 3, producing an output on pin 4 that unlocks the driver's door only. When the keyswitch is then moved a second time, the sensor switch 194 closes, grounding pins 2, 3, and 7 and producing an output on pin 5 that unlocks all doors.

This two-step unlock operation of the keyswitch is much different from the unlock operation of the central lock control switch 200. When the central lock control switch 200 is moved to the unlock position, both pins 2 and 7 of the CPU 190 are grounded. This produces signals on both output pin 4 and output pin 5. The driver's door and all other doors unlock simultaneously.

All after-market security systems manufacturers have tried to come up with the perfect upgrade to the factory keyed/keyless entry systems. These companies have produced single wire arm/disarm inputs for their upgrade system. This single wire input design has resulted in manufacturing many different SKUs (stock keeping units), due largely to the many different types of door lock switching methods used by automobile manufacturers.

In contrast, the present invention may be used in circuits where the CPU is 12-volt activated or activated by a combination of ground and 12 volts. Either the 1, 0 or 0, 1 signal code disarms the upgraded system, thus the upgrade package is compatible with both negative- and positive-logic systems. This is important because it minimizes the number of different SKUs that must be kept in inventory, as well making the factory upgrade unit much more secure.

This is accomplished by the 2-wire disarm control provided in accordance with the present invention. Because the upgrade connects output pin 4 of the factory-installed CPU 190 to input 216 of the gate 214 and output pin 5 to input 218 of that same EXCLUSIVE OR gate 214, the disarm sequence can only occur when the keyswitch, or the receiver are activated. As indicated by the truth table of FIG. 4b, when the mechanical keyswitch is rotated once, a signal on input 210 disarms the alarm processing unit 208, regardless of switch polarity. An attempt to disarm the system by lifting the central control switch 200, produces signals on both output pin 4 and output pin 5 simultaneously and does not disarm the alarm processing unit 208, as explained above.

The arm sequence is controlled by gate 220 and the DIP switch 228 and resistor 226 connected to input 224 on gate 220, which determine the polarity required on input 222 of gate 220. If the DIP switch 228 is open, the DIP switch and the pull up or "voltage protection" resistor 226 hold input 224 at VDD and grounding input 222 will produce a signal on input 212 that arms the alarm circuit 208. On the other hand, when the DIP switch is closed, input 224 is grounded so that when VDD is applied to input 222 an output signal occurs on input 212 of the alarm circuit 208, which arms the alarm circuit 208.

Additionally, inputs 300, 302 of the alarm circuit 208 added in this upgrade may also be connected to the channel 2 and 3 outputs of the existing remote-control receiver 199, respectively, to provide the advantageous split-channel remote control operation described above with reference to FIG. 1.

Figure 5:
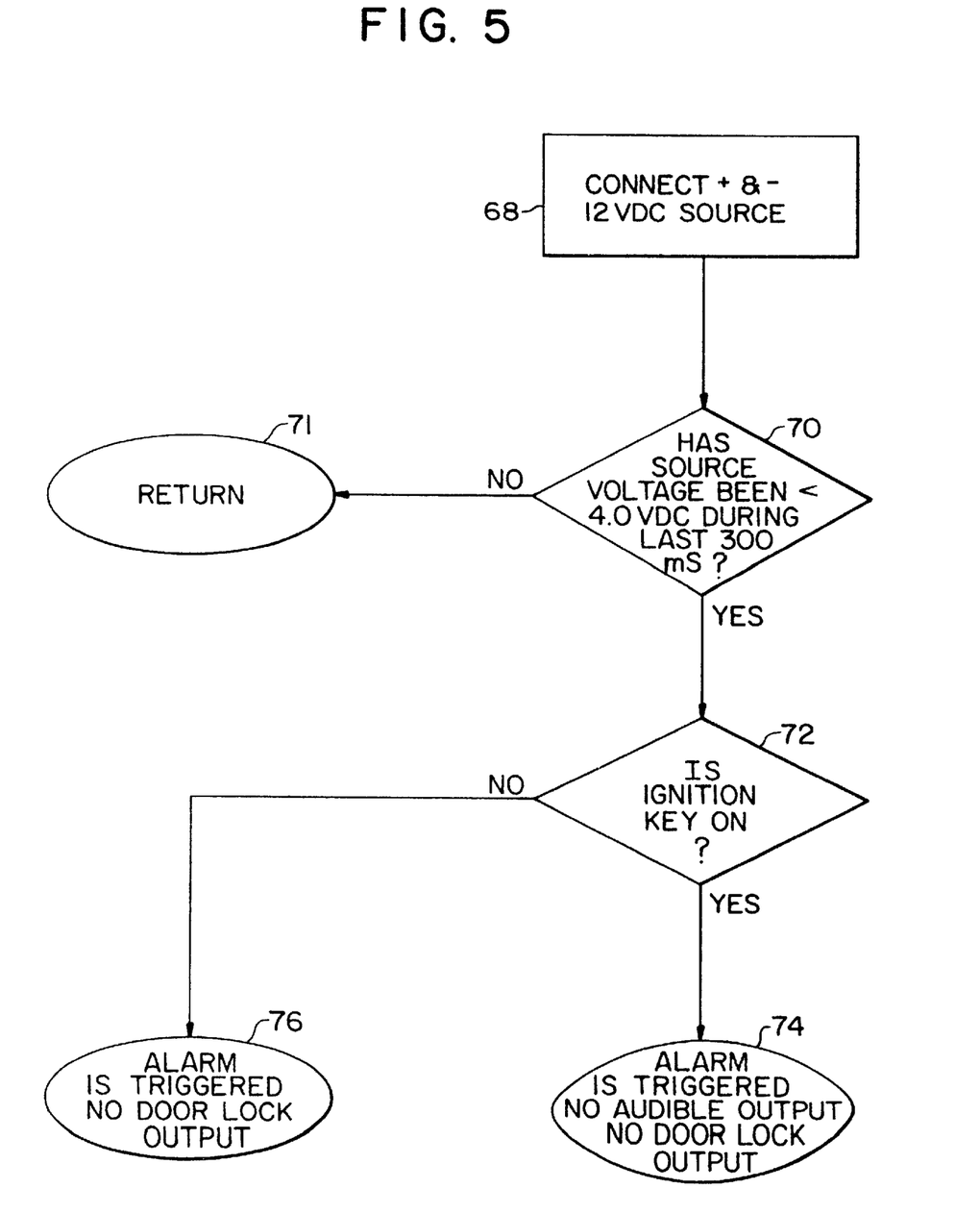
FIG. 5 is a logic flowchart of the power-up sequence.

Furthermore, the alarm circuit added in this upgrade may also advantageously be provided with a power-up control circuit 304 connected to input pins 1, 2 and 3 of the CPU 190 to effect an improved power-up sensing operation. FIG. 5 is a flowchart of the power-up feature, which provides improved system installation, battery reconnection, and anti-theft performance.

During an installation of alarm circuits in the field, after the automobile has left the factory, the installer usually first disconnects the automobile battery, then installs the alarm circuit, and lastly reconnects the battery. In prior art systems when the battery is reconnected, the system came on armed, locks all the doors, and activates the siren. The installer often finds at that time, that the keys are in the ignition, the doors are locked, and the siren is going off. In a garage, or in any close quarters where there are workers, the siren is not only disturbing, but may be a safety hazard. The keys needed to turn off the system are locked in the car.

As shown in FIG. 5, when automobile battery voltage is applied to the system 68, the alarm circuit 208 comes on armed. The alarm circuit 208 then determines whether VDD, the battery or source voltage applied to the alarm circuit 208 was less than 4 volts DC in the previous instant, e.g., 300 milliseconds earlier, as shown in decision box 70.

If the response to this inquiry is "no", then the alarm circuit disregards the interruption, returning whatever conditions existed before the power interruption at the "return" oval 71 in FIG. 5. If the response to the inquiry is "yes", then there is a second determination made at decision box 72: whether ignition keyswitch sensor indicates that the ignition switch is "on". If this was not an attempt to steal the car, the ignition keyswitch will be "on", resulting in the conditions listed in status box 74: (a) the system is armed, (b) there is no audible output, and (c) door locking is inhibited.

If the ignition key is not "on" then door locking is still inhibited by the power-up circuit, but the alarm circuit is triggered, providing audible alarms and other alarms, as shown at output 76. If the keys are inside the vehicle when this happens, at least the mechanic is not locked out.

Figure 6:
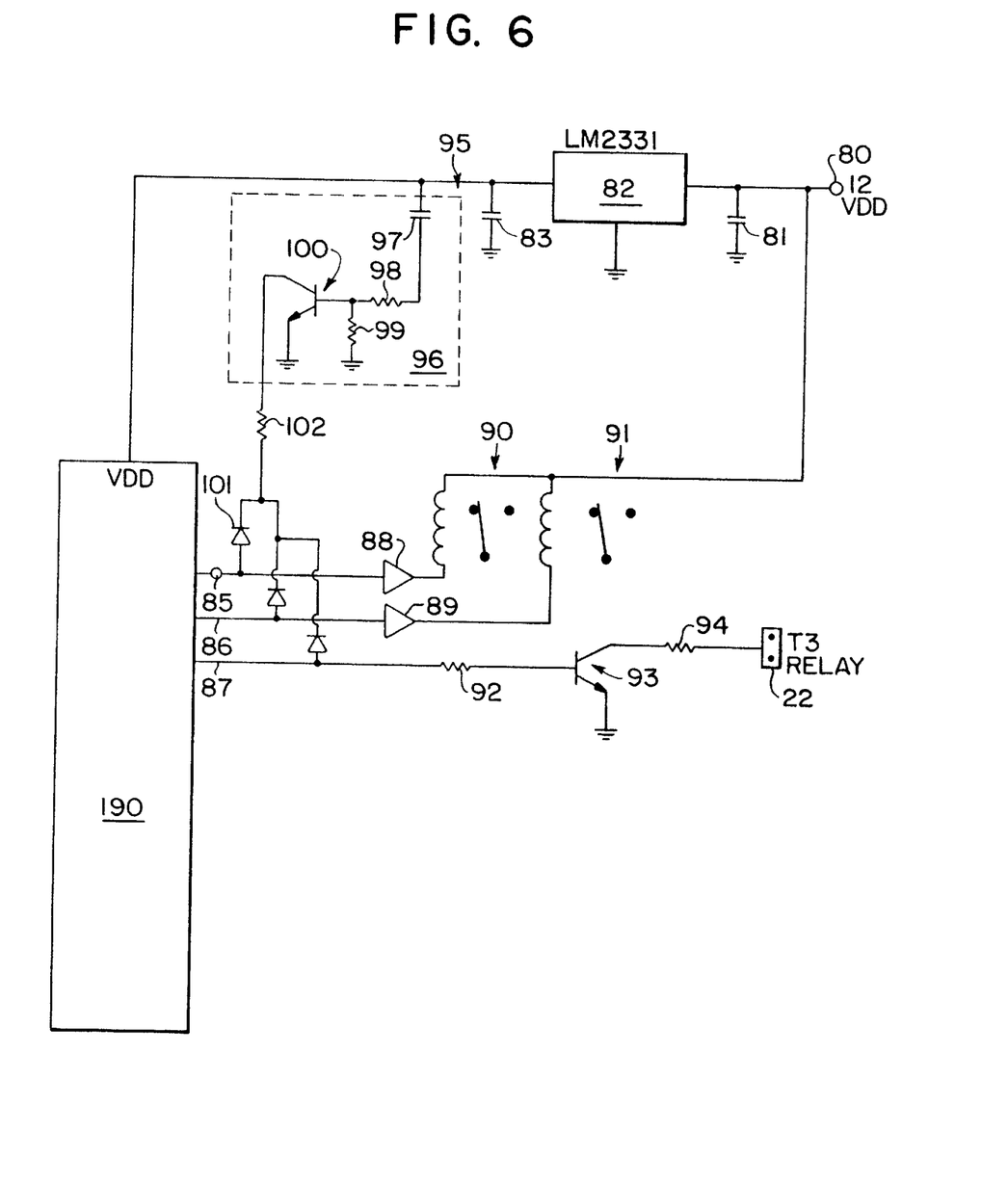
FIG. 6 is a schematic circuit diagram for FIG. 5.

FIG. 6 is a schematic circuit diagram of the part of the power-up circuit that inactivates the door locks when voltage is applied to the system. The battery is connected to terminal 80, as indicated by legend VDD. Smoothing capacitors 81 and 83 are connected in parallel between the battery and ground on either side of a voltage regulator 82.

After smoothing capacitor 83 VDD is connected to the VDD input of the door control CPU 190 indicated here as VDD'. Three outputs of the CPU 190 are shown at respective reference numerals: the output at pin 6 which locks all doors 85, at pin 4 which unlocks one door 86, and at pin 5 which unlocks all doors 87.

Signal pulses on output pins 6 and 4 are connected through amplifiers 88, 89, respectively, to windings of two door lock relays, shown schematically at 90 and 91. The pin 4 output 87 is connected to relay 22 through an amplifier and a buffer circuit of a first resistor 92, a transistor 93, and second resistor 94. Any convenient or conventional amplifiers and relays may be used.

A time delay circuit 96 is connected between the three CPU outputs 85, 86, 87, and the output of the smoothing power supply 81, 82, 83. The delay circuit 96 grounds relays 90 and 91 for a short period of time, thereby disabling any control signals being sent to the door lock relays 22, 90, 91. For example, a positive pulse with a duration of about 500 milliseconds may be used as the output signal. Then, if the outputs 85, 86, and 87 are grounded for 600 milliseconds after power is restored at VDD, that 600 millisecond period will include any 500 millisecond control pulse that is initially produced on the outputs.

The time delay circuit 96 includes an RC timing circuit of a capacitor 97 and two resistors 98, 99, connected in series with an output between the pair of resistors connected to the base of a transistor 100. The emitter of the transistor 100 is grounded and its collector is connected to each of the outputs 85, 86, 87 of the unit 18 through three forward-biased diodes 101. A shunt resistor 102 is included between the diodes 101 and the collector. When power first comes on at VDD, transistor 100 initially turns on, thereby bringing the collector to ground, and also each of the three outputs 85, 86, 87 through the forward biased diodes 101 to ground. The voltage slowly rises at the base due to the time circuit, and after approximately 600 milliseconds the transistor 100 is turned off.

The door lock inhibit circuit of FIG. 6 may be added independently to an existing lock-and-alarm system. Its function may be performed with the circuitry shown, or with any convenient or conventional circuitry. If a microcontroller is used, the time delay could be software programmed therein.

When the inhibit circuit of FIG. 6 is added in combination with the alarm control circuit shown in FIG. 4a, the upgraded system provides an armed but without a change in its locked or unlocked condition every time the voltage source is reconnected. In this condition, the starter is disconnected and no alarms are sounding. However, unless the system is properly disarmed using the key, keypad or remote transmitter, a subsequent input from the sensors 304 will activate the alarms that are controlled by the alarm circuit 208: flashing lights, siren, car horn, etc.

Security systems upgraded in accordance with the invention make theft more difficult, are easy for the automobile owner to use, and enhance the owner's personal security both in unlocking in the vehicle and in the parking it. They are also easy to manufacture and install and consistent with a wide range of existing equipment and, therefore, economical to use.

In particular, the EXCLUSIVE OR gates in this upgrade package facilitate its installation by being easily adaptable to a variety of vehicle security systems. They also permit one unit to be stocked for most of the many different vehicle models in the showroom and on the road.

The invention has been described with particular reference to a presently preferred embodiment. However, variations and modifications may be made within the spirit and scope of this invention, which is defined in the appended claims. For example, circuits providing equivalent logic functions may be used pursuant to DeMorgan's Theorem and the principles of Boolean algebra.

Furthermore, although the invention has been described with particular reference to automobile security issues, it should be understood that the alarm is applicable also to other vehicles such as, but not limited to, trucks, travel trailers, recreational vehicles, motor homes, boats, and in the marine industry.

We claim:

1. A security system upgrade kit for a vehicle including a door lock switch connected to provide electrical lock and unlock signals, a two-step door lock mechanism connected so as to sequentially unlock one door of the vehicle in response to a first unlock signal from the door lock switch, and then unlock a second door of the vehicle in response to a subsequent unlock signal from the door lock switch, a central control switch connected to said two-step door lock mechanism so as to provide signals to simultaneously unlock said first and second doors and an ignition switch, and to disarm a vehicle alarm, said upgrade kit comprising:

an alarm circuit having a disarm input and adapted to be connected to said vehicle alarm; and a disarm control circuit adapted to be connected to the two-step door lock mechanism and to said disarm input of said alarm circuit so as to disarm said alarm circuit in response to activation of said two-step door lock mechanism upon which said doors are unlocked sequentially and further including inhibiting circuitry connected to said control switch to prevent said alarm circuit from disarming the vehicle alarm in response to activation of said central control switch upon which said first and second doors are unlocked simultaneously.

2. The security system upgrade of claim 1 further comprising an arming control circuit, said arming control circuit having a first input adapted to receive a binary signal when the system is to be armed, and a second input connected to a polarity-select circuit so as to selectively provide a binary 0 or 1 signal to said second input, said circuit providing an arming signal at its output in response to a simultaneous combination of a binary 0 signal provided by said polarity-select circuit and a first given signal on said first input, or of a binary 1 signal provided by said polarity-select circuit signal, and a different, second signal on said first input.

3. The security system upgrade of claim 2, wherein said arming control circuit is an EXCLUSIVE OR gate.

4. The security system upgrade of claim 2, wherein said arming control circuit is a NAND gate.

5. The security system upgrade of claim 1 further comprising first and second disarm inputs and a disarm output, said first disarm input being adapted to receive a signal when the first door is unlocked and said second disarm input being adapted to receive a signal when another door is unlocked, said first and second inputs being adapted to receive a signal when both doors are unlocked simultaneously, so as to prevent said disarm control circuit from producing a disarm signal on said disarm output when the doors are unlocked simultaneously, said disarm control circuit output being adapted to be connected to the disarm input of the alarm circuit.

6. The security system upgrade of claim 5, wherein said disarm control circuit is an EXCLUSIVE OR gate.

7. The security system upgrade of claim 5 wherein said alarm circuit is connected so as to respond to said disarm signal only when said disarm signal is applied to said disarm input for at least a predetermined time with no gaps in the signal longer than a predetermined length.

8. The security system upgrade of claim 7 wherein said alarm circuit responds to a disarm signal only when said disarm signal is applied to said disarm input for at least two hundred fifty milliseconds and has gaps no longer than one hundred milliseconds in length.

9. The security system upgrade of claim 1 further comprising a power-up circuit, said power-up circuit being connected to a power supply in the vehicle so as to disable the door lock mechanism, so that the alarm circuit is armed but the vehicle does not lock when voltage is applied by the power supply to the security system.

10. The security system upgrade of claim 9 further comprising a sensor input adapted to provide a signal to the alarm circuit indicating whether the voltage applied to the security system was lower than a predetermined voltage at a predetermined time shortly before voltage is applied to the security system.

11. The security system upgrade of claim 10 further comprising a sensor input adapted to provide a signal to the alarm circuit indicating the status of the ignition switch, said alarm circuit being connected so that when voltage is applied to the security system and the alarm circuit determines that the voltage applied to the security system was lower than a predetermined voltage at a predetermined time shortly before voltage is applied to the security system, the alarm circuit will be triggered in response to a signal indicating a given status of said switch.

12. The security system upgrade of claim 1 further comprising a three-channel remote control receiver unit wherein said alarm circuit is adapted to produce first and second outputs in response to a signal received on one of said channels when said security system is armed, and disarmed, respectively.

13. The security system of claim 11 wherein said gaps are less than half the predetermined period and no longer than the gaps produced by contact bounce in the security system.

14. The security system of claim 11 wherein said alarm circuit disarms when said disarm signal is applied to said disarm input of the alarm circuit for at least two hundred fifty milliseconds during which said disarm signal has no gaps longer than one hundred milliseconds in length.

15. The security system of claim 11, wherein the door lock switch is a mechanical key lock.

16. The security system of claim 11, wherein the door lock switch is a remote control receiver unit.

17. The system of claim 11, wherein the door lock switch is an externally-mounted keypad unit.

18. A vehicle security system, comprising:
    a door lock switch connected to provide electrical lock and unlock signals;
    a two-step door lock mechanism connected so as to sequentially unlock one door of the vehicle in response to a first unlock signal from the door lock switch, and then unlock a second door of the vehicle in response to a subsequent unlock signal from the door lock switch;
    a central control switch connected to said two-step door lock mechanism so as to provide signals to simultaneously unlock said first and second doors;
    a disarm control circuit connected to said two-step door lock mechanism so as to disable said disarm control circuit in response to activation of said central control switch upon which said doors are unlocked simultaneously rather than sequentially, so as to prevent said disarm control circuit from producing a disarm signal when said central control switch is activated;
    an alarm circuit connected to said disarm control circuit so as to be disarmed in response to a disarm signal from said disarm control circuit;
    a door lock control circuit having a first output connected to provide the first door unlock control signal when the first door is unlocked;
    a second output connected to provide the second door unlock control signal when another door is unlocked, and
    first and second inputs connected to the door lock switch and the central control switch so as to provide said first and second outputs in response to the unlocking of the first door and the unlocking of another door, respectively; wherein
    said first and second unlock signals on respective first and second inputs produce respective first and second unlock signals on respective outputs.

19. The security system of claim 18 wherein said disarm control circuit has first and second disarm control inputs connected to said first and second door lock control circuit outputs, respectively.

20. The security system of claim 18, wherein said disarm control inputs are connected to respective inputs of an EXCLUSIVE OR gate and an output of said EXCLUSIVE OR gate provides said disarm signal.

21. The security system of claim 18, wherein said door lock control circuit further comprises a third input connected to the door lock switch and to said central control switch, and a third output providing a door lock control signal so as to lock said doors in response to a lock signal from said door lock switch or said central control switch, whereby the vehicle doors are locked, and an arming control circuit having a first arming input connected to said third output, a second arming input connected to a polarity-select circuit, and an arming control output provide an arming signal in response to signals applied to said first and second arming inputs, said output being connected to the alarm circuit so as to arm said system.

22. The security system of claim 19 wherein said polarity-select circuit selectively connects said second arming input to a given logic level.

23. The security system of claim 19 wherein said arming control circuit comprises an EXCLUSIVE OR gate, and said polarity-select circuit comprises a switch having a first terminal connected so as to apply a first reference potential to said arming control circuit, and a second terminal connected so as to apply a second reference potential to said arming control circuit through a resistor.

24. The security system of claim 21 wherein said first and second reference potentials are ground and a voltage provided by a battery, respectively.

25. The security system of claim 18, wherein said alarm circuit includes a disarm unit, and said alarm circuit is connected so as to respond to a disarm signal from said disarm unit only when said disarm signal is applied to said disarm input for at least a predetermined time with no gaps in the signal longer than a predetermined length.

26. A method of upgrading a vehicle security system, said security system having a two-step door lock mechanism connected so as to sequentially unlock one door of the vehicle in response to a first unlock signal from the door lock switch, and then unlock a second door of the vehicle in response to a subsequent unlock signal from the door lock switch, a central control switch connected to said two-step door lock mechanism so as to provide signals to simultaneously unlock said first and second doors and an ignition switch and to disarm a vehicle alarm, said method comprising the steps of:

connecting one input of a disarm control circuit to receive the unlock-first-door signal;

connecting another input of the disarm control circuit to receive the unlock-second-door signal; and connecting an output of the disarm control circuit to the disarm input of an alarm circuit of the vehicle alarm, said output providing a signal so as to disarm said alarm circuit in response to activation of said two-step door lock mechanism upon which said doors are unlocked sequentially and further connecting said central control switch to inhibiting circuitry to prevent said alarm circuit from disarming the vehicle alarm in response to activation of said central control switch upon which said first and second doors are unlocked simultaneously.

27. The method of claim 26 further comprising the step of programming the alarm circuit to respond to a disarm signal from the disarm control circuit, only if said disarm signal is applied to said disarm input for at least a predetermined time with no gaps in the signal longer than a predetermined length.

28. The method of claim 26 further comprising the steps of:

connecting one input of an arming control circuit to the lock-all-doors signal output;

setting a switch to select the polarity of a signal applied to another input of the arming control circuit so that a signal having a desired polarity is provided at an output of the arming control circuit in response to the lock-all-doors signal; and connecting an output of the arming control circuit to an arming input of the alarm circuit.

29. The method of claim 26 further comprising the steps of:

connecting a first-channel output of a remote control receiver to a first-channel input on the alarm circuit; and connecting a first and a second first-channel output on the alarm circuit to respective device drivers so that a first driver is activated by a signal on the first channel when the alarm circuit is armed and a second driver is activated by a signal on the first channel when the alarm circuit is disarmed, respectively.

30. The method of claim 26 further comprising the step of:

connecting the starter motor driver to the alarm circuit, so that the starter motor is disabled when the alarm circuit is armed.

31. The method of claim 30 further comprising the steps of:

connecting a power-up control circuit to a Power supply in the vehicle; and connecting the door lock signal output to a power-up control circuit so that the door lock signal output is disabled for a predetermined period when voltage is applied by the power supply to the security system.

32. The method of claim 31 further comprising the steps of:

connecting an ignition sensor input to the alarm circuit so that the alarm system will be triggered when voltage is applied to the security system if the ignition system is active.

33. The method of claim 32 further comprising the steps of:

sensing if an ignition key of said vehicle is on, and impeding at least one audible output from said triggered alarm system when said key is on.

34. A method of upgrading a vehicle security system including a door lock control circuit having first- and second-door-unlock control signal outputs and an alarm control circuit, said alarm control circuit having a disarm input, said method providing improved vehicle security, said method comprising the steps of:

disconnecting the disarm input of the alarm control circuit from any connections external to the alarm control circuit;

connecting a first of two inputs of an EXCLUSIVE OR gate to the first-door-unlock control signal output;

connecting a second of said two inputs of said EXCLUSIVE OR gate to the second-door-unlock control signal output; and connecting the disarm input of the alarm control circuit to an output of said EXCLUSIVE OR gate so that said alarm control circuit is disarmed when one but not two signals are provided to said two inputs of the EXCLUSIVE OR gate.

* * * * *